UNITED STATES PATENT OFFICE.

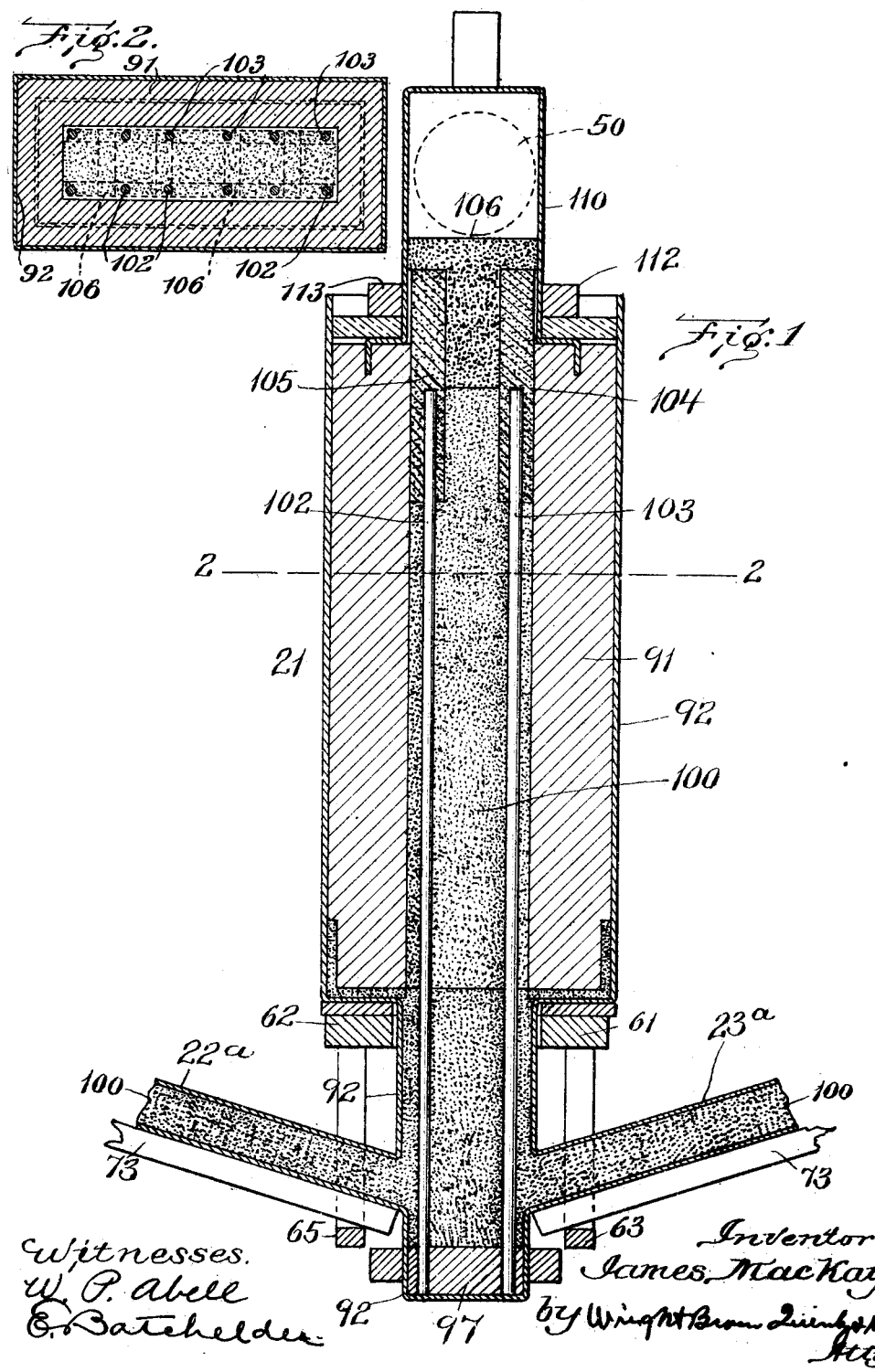

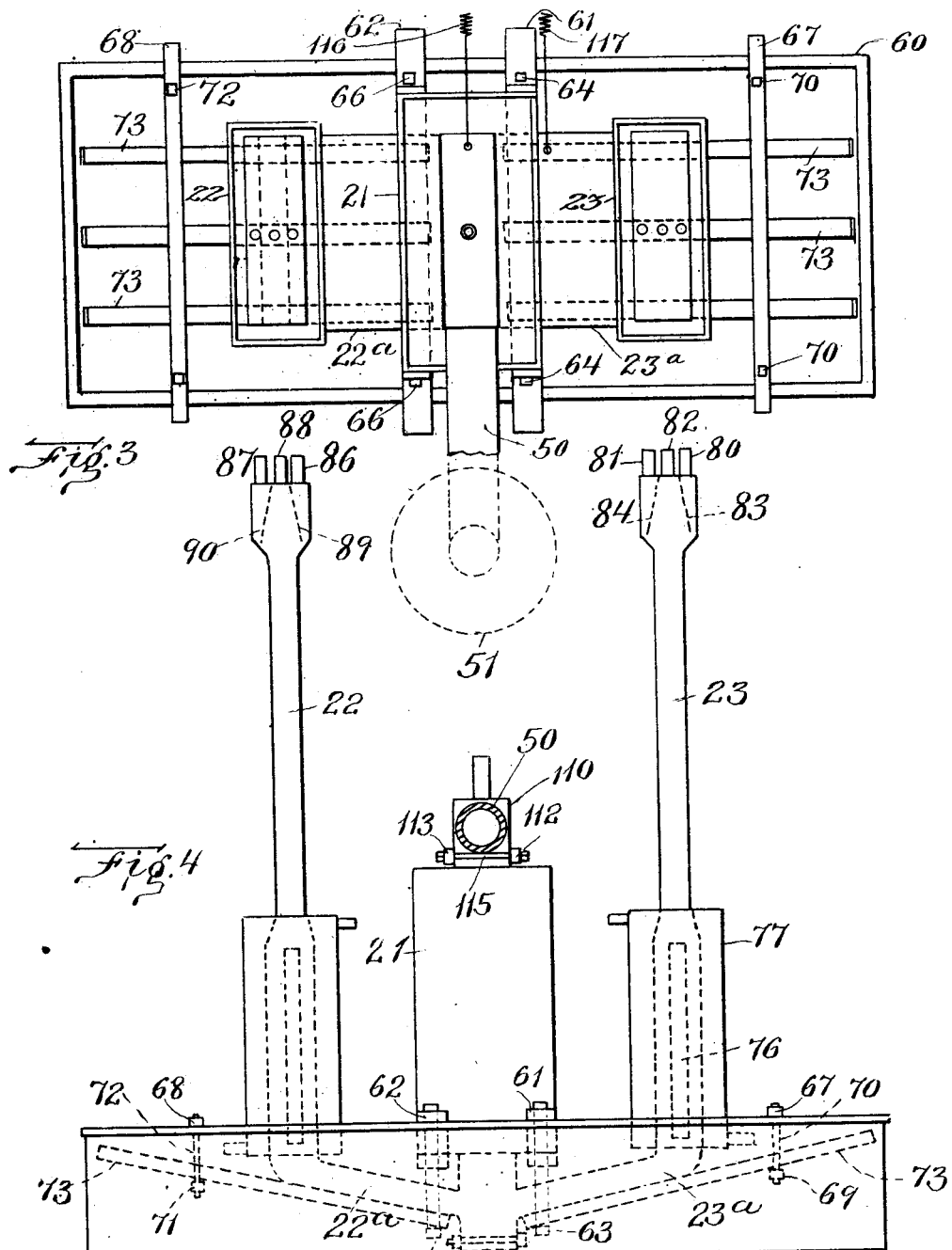

JAMES MacKAYE, OF CAMBRIDGE, MASSACHUSETTS, ASSIGNOR TO STONE & WEBSTER, OF BOSTON, MASSACHUSETTS, A FIRM.

ELECTRICALLY-HEATED REACTION-CHAMBER.

1,051,743.
Specification of Letters Patent.
Patented Jan. 28, 1913.

Original application filed March 20, 1906, Serial No. 307,070. Divided and this application filed September 17, 1910. Serial No. 582,445.

*To all whom it may concern:*

Be it known that I, JAMES MacKAYE, a citizen of the United States, and a resident of Cambridge, in the county of Middlesex and State of Massachusetts, have invented certain new and useful Improvements in Electrically - Heated Reaction-Chambers, of which the following is a specification.

This invention relates to a reaction chamber in which chemical elements or compounds in gaseous form may react to form new compounds, and the electrical means whereby the chamber may be heated to the desired degree of temperature.

The electrically heated chamber in which the present invention is embodied is capable of employment, among other uses, in connection with chemical apparatus such as that described and claimed in Letters Patent 1,009,428, granted to me Nov. 21, 1911, for apparatus for producing chlorids of carbon, of which application the present one is a division.

An embodiment of my invention in a reaction chamber, adapted to be electrically heated to cause gases to react on one another, and an apparatus in which such reaction chamber may be employed, are illustrated in the accompanying drawings, forming part of this application, and are described in the following specification, an apparatus for producing chlorids of carbon being here shown for illustration of one possible use of the invention, but not in any sense as a limitation of the use of the same to combinations of the particular gases from which chlorids of carbon are made.

In the drawings Figure 1 represents a reaction chamber, in which my invention is embodied, in vertical section. Fig. 2 is a cross-section on line 2—2 of Fig. 1. Figs. 3 and 4 represent respectively a plan and elevation of an apparatus in connection with which the electrically heated reaction chamber forming the subject of the present invention is adapted to be used.

The same reference characters indicate the same parts in all the figures.

The reaction chamber is designated by the numeral 21 and in its present embodiment has branches 22ª, 23ª leading from its lower portion to stacks 22, 23, respectively, through which the gases which are intended to react upon one another are conducted to the chamber.

A convenient arrangement and construction of the reaction chamber is to have two branches extending oppositely and to provide an equal number of stacks between which the reaction chamber is placed. The chamber and stacks are conveniently contained partly in a pan or other receptacle 60 adapted to hold water, and maintained in any suitable frame or support, the chamber being supported so that a regulation of the heat of the chamber may be effected by means of the water in the pan. A convenient means for supporting the chamber and stacks independently of the pan consists of slats 61 and 62 on which the upper part of the reaction chamber rests, bars 63 and 65 hung from said slats by bolts 64 and 66, slats 67, 68, a bar 69 hung from the slat 67 by bolts 70, a bar 71 hung from the slat 68 by bolts 72, and inclined slats 73 resting on the bars 63, 69, and 65, 71 respectively. The slats 61, 62, 67 and 68 are adapted to be supported independent of the pan by means not shown.

Gases admitted to the stack 22 through the inlets 86, 87 and 88 are permitted to flow through the branch 22ª into the lower part of the chamber where they are heated by the electrical means hereinafter described, and after forming new compounds are conducted away from the upper part of the stack through a pipe 50 to a condenser or other receptacle 51. Likewise the substances to be combined entering the stack 23 through the inlet ports 80, 81 and 82 flow through the branch 23ª into the reaction chamber and are combined in like manner and conducted away through the outlet 50.

The cross sectional area of the lower part of each stack 22, 23, is subdivided for a short distance to increase the cooling surface by means of a chamber 76. The subdivided part of each stack is surrounded by a water jacket 77 of any suitable material. Two diaphragms 83, 84 are arranged on either side of the port 82 and extend down a substantial distance into the stack, permitting the natural gas to enter the stack, but keeping it separate from the substances entering ports 80, 81. The stack 22 is provided with diaphragms 89, 90 corresponding with the diaphragms 83, 84.

The electrically heated portion of the reaction chamber is constructed of a material which is adapted to withstand the action of heat and the chemical action of the reacting substances, and which is also a non-conductor of electricity. A material which I find convenient for this purpose is soapstone. The main part of the chamber is accordingly preferably made from a block of this material 91, by cutting a hole in its interior so as to have the walls all in one piece without joints. The interior of the chamber and of the branches 22ª, 23ª is filled with a suitable pulverized material such as coke, in order to permit the mixing and reaction of the gaseous substances without explosion. The outside of the chamber is covered with a sheathing of metal which is adapted to resist the corrosive action of the gaseous ingredients and products of the reaction and is accordingly preferably lead, this sheathing being designated at 92. At the bottom of the soapstone block the sheathing is bent inward and is then continued downward in line with the aperture which forms the chamber so as to make a continuation of such chamber. The sheathing is also arranged so as to form the outwardly and upwardly extending branches 22ª, 23ª and to form the bottoms of these branches and close the bottom of the chamber.

In a pocket formed by the lead sheathing at the bottom of the chamber is placed a block 97, preferably of lead, which extends throughout the whole length of the chamber and serves as a terminal. A series of rods 102 and 103, preferably arranged in two parallel lines near the opposite side walls of the chamber as shown in Fig. 2 have their lower ends embedded in this block by being placed in holes formed therein so that they are in electrical connection with the block. The upper ends of the rods 102 are set into a carbon block or terminal 105 at one side of the chamber and the rods 103 at their upper end are set into a similar carbon block or terminal 104. The rods themselves are of carbon or other high-resistance corrosion resisting conducting substance for the purpose of producing heat when an electric current is caused to traverse them. A carbon strip or block is placed between the terminals 104 and 105 and has a lip on each side which rests upon these terminals and prevents it from slipping down.

The upper end of the chamber is closed and the carbon strip 106 inclosed by a dome 110 of lead or equivalent suitable material, the ends of which are bent over and inserted in slots in the soapstone walls of the chamber. The upper edge of the lead sheathing 92 is not bent over, but is continued upward in order that it may not make electrical connection with the dome and thereby cause a short circuit between the terminals 97 and 104, 105. Bars 112 and 113 are arranged on opposite sides of the dome at the lower part thereof and are drawn together by bolts 115 at each end, in order to bind the parts firmly together. Electrical conductors 116 and 117 are connected to the dome 110 and to the sheathing of one of the inclined members as 23ª. These conductors are in connection with a source of electrical energy and conduct current to and from the opposite ends of the rods 102, 103, the current thereby flowing from the source of power to the terminal 97, through the rods to the terminals 104, 105, dome 110 and back to the source of power. Thereby the rods are heated and the temperature in the reaction chamber raised to the desired degree say from 250° to 600° C. Any suitable instrumentalities such as a switch, rheostat or the like may be employed to regulate the current so as to govern the degree of temperature as desired.

I claim—

1. A reaction chamber, the walls of which are composed of non-conducting material, a sheathing arranged upon the outside of said walls composed of material adapted to resist corrosive action of the contents of the chamber and to maintain the latter gas tight, and electrical means on the inside of said chamber for establishing a predetermined temperature therein and a filling of pulverized refractory material within said chamber.

2. A reaction chamber, the walls of which are composed of non-conducting material, a sheathing arranged upon the outside of said walls composed of material adapted to resist corrosive action of the contents of the chamber and to maintain the latter gas tight, a series of carbon rods in said chamber, and suitable electric connections with said rods whereby said rods may be heated and a cooling circulation outside the chamber for cooling the inlet portion of said chamber.

3. A reaction chamber, the walls of which are composed of non-conducting material, a sheathing arranged upon the outside of said walls composed of material adapted to resist corrosive action of the contents of the chamber and to maintain the latter gas tight, a series of carbon rods in said chamber, a carbon terminal with which said rods are connected at one end, a lead terminal with which said rods are connected at their other ends, and electrical connections with said terminals, whereby current is caused to traverse said rods to produce a heating effect in the chamber.

4. A reaction chamber having walls of non-conducting material and a filling of pulverized refractory material within said chamber, a sheathing outside of said walls and arranged to form a continuation of said chamber, a metallic terminal in such continuation of said chamber, carbon rods extending from said terminal through the chamber, a carbon terminal connected with said rods, and means for conducting a current of electricity to and from said terminals.

5. A reaction chamber having walls of non-conducting material and a filling of pulverized refractory material within said chamber, terminals in said chamber, electrical conductors connected to said terminals, and high resistance conductors passing between said terminals and electrically connected therewith, said high-resistance conductors being permanently contained in the chamber.

6. An electrically heated reaction chamber including non-conducting walls, a terminal inserted into one end of the chamber between said walls, a metallic sheathing inclosing an extension of said chamber and having lateral admission branches, a terminal in said extension, and high resistance conductors extending between said terminals through the chamber and a filling of pulverized refractory material within said chamber.

7. A gas-tight reaction chamber having a main body and inlet portion filled with comminuted carbon, a soapstone wall for said main body and a lead wall for said inlet portion; carbon rods within the main body of said chamber electrically heatable when desired and to the desired extent, and a cooling circulation for the exterior of the inlet portion of said chamber.

8. A gas-tight reaction chamber having a main body and inlet portion filled with comminuted non-corrodible refractory material, a non-corrodible heat-insulating wall for said main body, and a metallic corrosion resisting heat conducting wall for said inlet portion; non-corrodible conducting rods within the main body of said chamber electrically heatable when desired and to the desired extent and a cooling circulation for the exterior of the inlet portion of said chamber.

9. A gas-tight reaction chamber having a main body and an inlet portion filled with a comminuted refractory material, the main body having heat-insulating walls and the inlet portion having walls readily conducting heat; carbon rods located in the main body of said chamber heatable when and as much as desired and so arranged as to heat the comminuted refractory material in the main body of the chamber evenly and a cooling circulation for the inlet portion of said chamber.

In testimony whereof I have affixed my signature, in presence of two witnesses.

JAMES MacKAYE.

Witnesses:
W. E. ABELL,
JAS. H. CHURCHILL.